Patented Mar. 22, 1949

2,465,308

UNITED STATES PATENT OFFICE 2,465,308

ARSENOSO COMPOUNDS AND METHOD OF PREPARATION

Herman Herbert Fox, Passaic, and Wilhelm Wenner, Montclair, N. J., assignors to Hoffmann-La Roche Inc., Nutley, N. J., a corporation of New Jersey No Drawing. Application November 27, 1946, Serial No. 712,740

12 Claims. (Cl. 260—440)

The present invention relates to new arsenicals and their method of production. More particularly the invention relates to a new arsenoxide of the following formula:

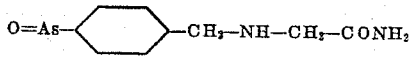

and the salts thereof.

We have assigned the name N-(p-arsenosobenzyl)-glycineamide thereto.

Among the difficulties encountered in the therapeutic application of heretofore known arsenoxides is the instability of the compounds as such and in aqueous solutions. This makes it necessary for the compounds to be supplied to the medical practitioner in dry form sealed in ampules together with a second ampule containing distilled water. For injection purposes, the solution of the arsenoxide must be freshly prepared by the physician and employed immediately. In other words, with known arsenoxides the physician has to go through an on-the-spot preparation of the solution. Due to the instability of the solutions and the danger of toxic compounds being formed by decomposition of the arsenoxides an already-prepared solution in ampule form was not available. Our new arsenoxide on the other hand allows the preparation of stable equeous solutions which can be ampuled, and in this form provides the physician with ready-made solutions for administration.

Our new arsenoxide and the salts thereof with acids, as for example, the hydrochloride or sulfate, possess unusual and remarkable properties. They combine high activity and relatively low toxicity with remarkable stability, both in the crystalline form and in aqueous solution. They are microcrystalline solids, which are extremely stable. They can be handled in the presence of air and oxygen without undergoing decomposition. They are very soluble in water and can be employed to form neutral solutions which are unexpectedly and unusually stable. The aqueous solutions can be readily ampuled, and show no increase in toxicity, no discoloration nor decrease in activity when kept for weeks even at as elevated a temperature as 45° C.

As compared with other arsenoxides, as for example, the commonly employed oxophenarsine hydrochloride, it will be seen that our N-(p-arsenosobenzyl)-glycineamide and its salts, such as the hydrochloride, are highly superior in many respects. Oxophenarsine hydrochloride is an amorphous powder and is not obtainable as a crystallized solid. It varies in its arsenic content, and is therefore not a chemically pure compound. It is not stable, but turns dark on exposure to air, and must be stored at below room temperatures. Its solutions also darken on exposure to air, even at low temperatures. It is marketed in the form of a dry amorphous powder mixed with various stabilizing agents sealed in ampules, from which the physician must make up his own solution prior to injection.

On the other hand, our N-(p-arsenosobenzyl)-glycineamide and its salts are pure compounds obtainable in microcrystalline form. They are stable at room and higher temperatures. They do not darken on exposure to air or oxygen, either in crystalline form or in aqueous solution, and can be kept indefinitely at room temperature. The unusual stability of the aqueous solutions of the compound and its salts is among its outstanding advantageous features over the known arsenoso-compounds. Because of this unusual stability, our compounds allow the preparation of stable ampule solutions, a dosage form which is not available with heretofore known arsenoso compounds, as, for example, oxophenarsine hydrochloride. Our new compounds thus fill the long-felt need for an active, relatively nontoxic arsenoxide which can be marketed in stable solution packaged in ampule form.

The compounds are highly useful for therapeutic purposes.

According to our invention, N-(p-arsenosobenzyl)-glycineamide can be prepared by several methods. According to one method, p-arsonobenzylamine in aqueous alkaline solution, such as an aqueous solution of ammonia, sodium hydroxide, potassium hydroxide, or an alkali metal carbonate such as sodium carbonate, potassium carbonate and the like, is reacted with an halogenoacetamide, yielding N-(p-arsonobenzyl)-glycineamide. The latter compound in the presence of a dilute solution of a mineral acid such as hydrochloric acid or sulfuric acid, is then reduced as, for example, with sulfur dioxide and potassium iodide to form the N-(p-arsenosobenzyl)-glycineamide which is obtained in the form of the salt.

According to another method, our new compound can be prepared by reacting p-arsenosobenzylamine or its hydrate, p-arsonosobenzylamine, in an aqueous alkaline solution with a halogenoacetamide as, for example, chloroacetamide, and acidifying the mixture with a mineral acid such as hydrochloric acid or sulfuric acid. In this manner, N-(p-arsenosobenzyl)-glycineamide is directly obtained in the form of the salt.

Both p-arsonobenzylamine and p-arsenosobenzylamine are known compounds, being described by Doak, Eagle, and Steinman, J. A. C. S. 62. 3010 (1940).

The N-(p-arsonobenzyl)-glycineamide and its salts are new compounds and form the subject matter of our application Serial No. 712,739, filed November 27, 1946.

The following examples will serve to illustrate the preparation of our new compounds. It is to be understood that they are given by way of illustration and not by way of limitation.

EXAMPLE 1

N-(p-arsonobenzyl)-glycineamide 140 grams of p-arsonobenzylamine dissolved in 1300 cc. of hot N sodium hydroxide are treated with 113 grams of chloroacetamide. After boiling the solution for about ten minutes, the solution is acidified with glacial acetic acid, filtered hot and treated with 1700 cc. of ethyl alcohol. The mixture is cooled and the precipitate is filtered off and dried. The precipitate is nearly pure N-(p-arsonbenzyl)-glycineamide. Upon recrystallization from dilute ethanol, the product is obtained in the form of lustrous, colorless plates which decompose at 236° C.

EXAMPLE 2

N-(p-arsonobenzyl)-glycineamide 25 grams of p-arsonobenzylamine are treated with just enough hot 3N ammonium hydroxide to effect solution. The mixture is heated on a steam bath and 35 grams of chloroacetamide are added in portions. After some of the chloroacetamide has been added, a precipitate of p-arsonobenzylamine appears. The precipitate is redissolved by careful addition of ammonium hydroxide. Heating is continued until a sample of the reaction mixture fails to yield a precipitate on acidification with acetic acid, which usually requires about one-half hour after all of the chloroacetamide has been added. The reaction mixture is then acidified with acetic acid to pH 5-6 and the product is precipitated by the addition of a large excess of ethyl alcohol. Upon recrystallization from dilute ethyl alcohol, the product, N-(p-arsonobenzyl)-glycineamide, is obtained in the form of lustrous, colorless plates.

EXAMPLE 3

N-(p-arsenosobenzyl)-glycineamide hydrochloride 85 grams of N-(p-arsonobenzyl)-glycineamide, dissolved in 400 cc. of 2N hydrochloric acid, is treated with 0.4 grams of potassium iodide and sulfur dioxide is bubbled through the solution at room temperature. When the precipitation is complete, the mixture is cooled to 0° C. for about one hour and the crystals are filtered off, washed with a little cold water and dried. If necessary, the N-(p-arsenosobenzyl)-glycineamide hydrochloride may be purified by dissolving it in dilute sodium hydroxide and reprecipitating it with dilute hydrochloric acid at pH 1. The compound is a white microcrystalline solid which has no distinct melting point. It does not melt below 300° C.

In a similar manner, N-(p-arsenosobenzyl)-glycineamide sulfate can be prepared by employing 2N sulfuric acid instead of hydrochloric acid.

The free base, N-(p-arsenosobenzyl)-glycineamide may be obtained from the acid salts, such as the hydrochloride, by treatment of the salts with an equimolar amount of an alkali, such as a sodium hydroxide solution.

EXAMPLE 4

N-(p-arsenosobenzyl)-glycineamide hydrochloride 1 gram of p-arsenosobenzylamine or an equivalent quantity of its hydrate, dissolved in 5 cc. of N sodium hydroxide, is treated with 1.1 grams of chloroacetamide. The mixture is heated on a steam bath for about one half hour, filtered and then acidified to pH 1 with concentrated hydrochloric acid. On cooling for several days, a precipitate of N-(p-arsenosobenzyl)-glycineamide hydrochloride is obtained. The product is filtered off, washed with a little cold water and dried.

We claim:

1. A compound selected from the group consisting of N-(p-arsenosobenzyl)-glycineamide and the acid addition salts thereof.
2. N-(p-arsenosobenzyl)-glycineamide.
3. N-(p-arsenosobenzyl)-glycineamide hydrochloride.
4. N-(p-arsenosobenzyl)-glycineamide sulfate.
5. A process for preparing N-(p-arsenosobenzyl)-glycineamide and the acid salts thereof which comprises reacting p-arsonobenzylamine with a halogenoacetamide in alkaline aqueous solution to form N-(p-arsonobenzyl)-glycineamide and reducing the last-mentioned compound to the corresponding N-(p-arsenosobenzyl)-glycineamide.
6. A process for preparing N-(p-arsenosobenzyl)-glycineamide, which comprises reacting p-arsonobenzylamine in dilute sodium hydroxide solution with chloroacetamide and reducing the N-(p-arsonobenzyl)-glycineamide formed with sulfur dioxide in the presence of potassium iodide and a dilute mineral acid.
7. A process for preparing N-(p-arsenosobenzyl)-glycineamide, which comprises reacting p-arsonobenzylamine dissolved in ammonium hydroxide with chloroacetamide and reducing the resulting compound with sulfur dioxide in the presence of potassium iodide and a dilute mineral acid.
8. A process which comprises reducing N-(p-arsonobenzyl)-glycineamide with a reducing agent to form N-(p-arsenosobenzyl)-glycineamide.
9. A method of preparing N-(p-arsenosobenzyl)-glycineamide which comprises reacting a member selected from the group consisting of p-arsenosobenzylamine and its hydrate with a halogenoacetamide in an alkaline aqueous medium.
10. A method of preparing N-(p-arsenosobenzyl)-glycineamide which comprises reacting p-arsenosobenzylamine dissolved in a dilute sodium hydroxide with chloroacetamide.
11. A process of preparing N-(p-arsenosobenzyl)-glycineamide which comprises reacting an acid salt of N-(p-arsenosobenzyl)-glycineamide with an alkali.

12. A process as in claim 11 wherein the salt is the hydrochloride and the alkali is in the form of an aqueous solution of sodium hydroxide.

HERMAN HERBERT FOX.
WILHELM WENNER.

REFERENCES CITED

The following references are of record in the file of this patent:

UNITED STATES PATENTS

| Number | Name | Date |
| --- | --- | --- |
| 1,280,122 | Jacobs et al | Sept. 24, 1918 |
| 1,835,433 | Schmidt | Dec. 8, 1931 |

OTHER REFERENCES

Friend, ed., "Textbook of Inorganic Chemistry," vol. XI, pt. II, by Goddard, "Organometallic Compounds" (1930) pages 231-233.

Doak et al., "J. Am. Chem. Soc.," vol. 62, pages 3010-3011 (1940).